(12) United States Patent
Kaufmann et al.

(10) Patent No.: US 11,959,555 B2
(45) Date of Patent: Apr. 16, 2024

(54) VALVE AND DIAPHRAGM PUMP WITH INLET AND OUTLET VALVES

(71) Applicant: KNF Flodos AG, Sursee (CH)

(72) Inventors: Stephan Kaufmann, Gunzwil (CH); Michael Bucher, Langau b. Reiden (CH); Andreas Wüthrich, Zofingen (CH)

(73) Assignee: KNF Flodos AG, Sursee (CH)

(*) Notice: Subject to any disclaimer, the term of this patent is extended or adjusted under 35 U.S.C. 154(b) by 38 days.

(21) Appl. No.: 17/920,094

(22) PCT Filed: Apr. 29, 2021

(86) PCT No.: PCT/EP2021/061254
§ 371 (c)(1),
(2) Date: Oct. 20, 2022

(87) PCT Pub. No.: WO2021/228567
PCT Pub. Date: Nov. 18, 2021

(65) Prior Publication Data
US 2023/0160482 A1 May 25, 2023

(30) Foreign Application Priority Data
May 11, 2020 (DE) .......................... 102020112696.4

(51) Int. Cl.
*F16K 15/02* (2006.01)
*F16K 27/02* (2006.01)
(Continued)

(52) U.S. Cl.
CPC ........ *F16K 15/028* (2013.01); *F16K 27/0209* (2013.01); *F04B 45/04* (2013.01); *F04B 53/10* (2013.01)

(58) Field of Classification Search
CPC .. F16K 15/028; F16K 27/0209; F16K 15/144; F16K 15/162; F04B 45/04; F04B 53/10
See application file for complete search history.

(56) References Cited

U.S. PATENT DOCUMENTS

| 3,039,487 A | 6/1962 | Doeg |
| 5,960,825 A * | 10/1999 | Scancarello ........ F16K 15/1401 137/856 |
| 2013/0118622 A1* | 5/2013 | Patzold ................. F16K 15/144 137/855 |

FOREIGN PATENT DOCUMENTS

| DE | 202004009673 | 9/2005 |
| DE | 102005005473 | 8/2006 |

(Continued)

*Primary Examiner* — P. Macade Nichols
(74) *Attorney, Agent, or Firm* — Volpe Koenig

(57) ABSTRACT

A plate or check valve, for diaphragm pumps, including a valve chamber in which at least one valve seat is provided that interacts with a valve plate that is elastically pretensioned via outer edge mountings such that a closing body of the valve plate can be moved from a closed position, in which it sealingly lies on the valve seat, into an open position against the elasticity of the valve plate. The outer edge mountings have webs and connecting brackets which are connected to the web ends facing away from the closing body. The outer edge mountings are disconnected from one another and only engage on the closing body, each of the outer edge mountings has at least two webs that are connected together via a connecting bracket, and each connecting bracket engages behind at least one paired holding base of the valve housing.

22 Claims, 4 Drawing Sheets

(51) Int. Cl.
*F04B 45/04* (2006.01)
*F04B 53/10* (2006.01)

(56) References Cited

FOREIGN PATENT DOCUMENTS

| | | |
|---|---|---|
| DE | 102008043309 | 5/2010 |
| DE | 112007000722 | 7/2013 |
| DE | 102016002071 | 8/2017 |
| EP | 0336307 | 10/1989 |
| EP | 01555469 | 7/2005 |
| WO | 2013171585 | 11/2013 |

* cited by examiner

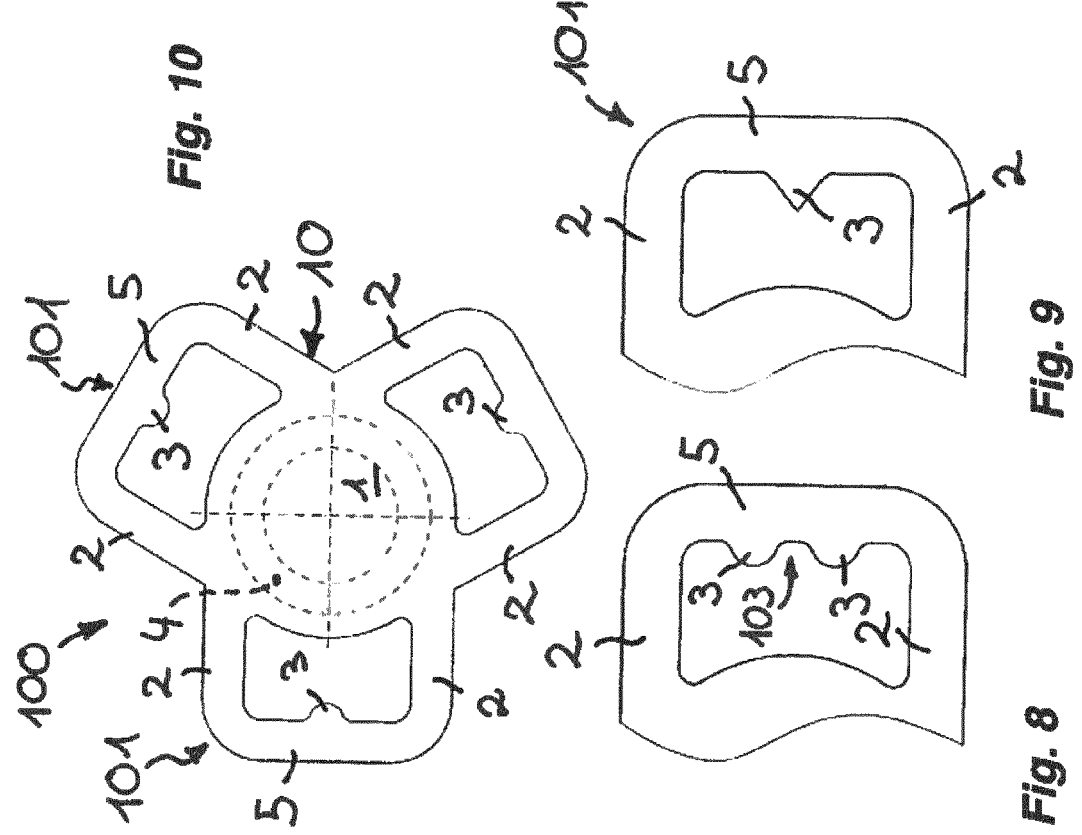

VALVE AND DIAPHRAGM PUMP WITH INLET AND OUTLET VALVES

INCORPORATION BY REFERENCE

The following documents are incorporated herein by reference as if fully set forth: International Application No. PCT/EP2021/061254, filed Apr. 29, 2021; and German Patent Application No. 10 2020 112 696.4, filed May 11, 2020.

TECHNICAL FIELD

The invention concerns a valve, in particular a plate or check valve, for example for diaphragm pumps, with a valve chamber which is delimited by a valve housing and in which at least one valve seat is provided which cooperates with a valve plate, which plate is elastically preloaded for tension via outer edge mountings such that a closing body of the valve plate can be moved from a closed position, in which the closing body lies tightly on the valve seat, into an open position against the elasticity of the valve plate at least in the region of its outer edge mountings, wherein the outer edge mountings of the valve plate have webs, and wherein the outer edge mountings have connecting brackets which are connected to the ends of the web facing away from the closing body.

The invention also concerns a diaphragm pump with at least one inlet and at least one outlet valve.

BACKGROUND

EP 1 555 469 A1 describes a valve of the above-mentioned type having a valve chamber which is delimited by a valve housing and in which at least one valve seat is provided. The valve seat which delimits a valve opening cooperates with a valve plate made of elastic material. This valve plate is held in the valve housing via outer edge mountings, and preloaded for tension such that a plate-like closing body of the valve plate, in the closed position of the valve, lies tightly on the valve seat and can be moved into open position of the valve by a pressure difference, against the elasticity of the valve plate, at least in the region of its outer edge mountings, in which open position the closing body is lifted from the valve seat. Each of the outer edge mountings of the valve plate has transverse webs which, at the web end facing away from the closing body, are connected to an anchor-shaped transverse web. These transverse webs are clamped in corresponding recesses in the valve housing.

With this so-called anchor valve according to EP 1 555 469 A1, the valve plate need perform no additional sealing function between the housing parts delimiting the valve housing and the valve chamber provided therein, and crushing in the sealing regions, reducing the function of the valve plate, is avoided. Since the elastic material used for the valve plate is not always chemically resistant to the conveying medium and may swell slightly, a clearance must be provided around the valve plate in the valve chamber because otherwise, the valve plate could distort on swelling and its function could be reduced. However, because of this clearance, the previously known anchor valve may lose its form-fit positioning, and the position of the valve plate and its closing body over the valve seat is no longer unambiguously defined.

In order to tightly close the valve seat in the closed position of the anchor valve, the valve seat often protrudes beyond the adjacent plane of the valve housing. The more this protrusion is subject to tolerances, the less tightly the valve plate and its closing body seal on the valve seat, in particular in the stationary state of the valve. For perfect closing behavior therefore, very low production tolerances are required, which can only be achieved however at great cost, in particular in very small pumps. Finally, these previously known anchor valves are difficult to install in the valve housing in an automated production process, in particular for very small pumps.

EP 0 336 307 A2 describes a check valve in which the valve plate has a ring seal on its outer circumference which is connected to a central closing body inside the valve plate via several webs. So that the closing body can perform the valve movements relative to the ring seal clamped in the valve housing, even when the valve plate is made from a hard elastic or comparatively rigid material, the webs are arranged transversely to a radial extent between the outer sealing ring and the inner closing body such that, during a valve movement, the closing body can twist slightly relative to the sealing ring and simultaneously open or close. Since however, in this previously known plate valve, the sealing ring of the valve plate is clamped in the valve housing, a crushing of the valve plate, reducing the function, can often not be avoided.

SUMMARY

It is therefore an object to create a valve of the type cited initially which can easily be mounted in the valve housing even in automatic production, and which is distinguished by improved functionality. In addition, the object is to provide a diaphragm pump with such a valve configured as an inlet and/or outlet valve.

This object is achieved according to the invention with a valve of the type cited initially, in particular in that the outer edge mountings are disconnected from one another and engage only on the closing body, that each outer edge mounting has at least two webs, that the webs of each outer edge mounting are connected together via a connecting bracket, and that each connecting bracket engages behind at least one assigned holding base of the valve housing.

The valve according to the invention also has a valve chamber which is delimited by a valve housing and in which at least one valve seat is provided. The valve seat cooperates with a valve plate which is elastically preloaded for tension via outer edge mountings such that a preferably plate-like closing body of the valve plate lies tightly on the valve seat in a closed position of the valve, in order from there to be moved into an open position by a positive pressure difference against the inherent elasticity of the material used for the valve plate, at least in the region of the outer edge mountings. The outer edge mountings of the valve plate here comprise webs and have connecting brackets which are connected to the ends of the webs facing away from the closing body. According to the invention, the outer edge mountings of the valve plate are disconnected from one another and engage only on the closing body of the valve plate, wherein each outer edge mounting has at least two webs. The webs of each edge mounting are connected together via a common connecting bracket, wherein each connecting bracket engages behind at least one assigned holding base of the valve housing. Since each connecting bracket engages behind at least one assigned holding base of the valve housing, there is no need for any function-reducing crushing of the valve plate, at least in the region of the connecting brackets. Since the valve plate is held correctly positioned in the valve housing by the respective connecting bracket engaging behind at least one holding base of the valve housing, the valve plate can easily be installed, even in an automatic production process. The closing body of the valve plate can easily be lifted from the valve seat under a positive pressure difference, wherein only a slight by-flow cross-section around the closing body is blocked by the webs, while under a negative pressure difference, the valve plate with its closing body lies tightly on the valve seat and seals this reliably. Here, only a comparatively small (dead) space in the valve housing is used for the outer edge mountings of the valve plate.

In the valve according to the invention, the outer edge mountings do not have a common peripheral connecting element which may also serve for sealing and which would be connected to a central closing body via the webs which are spaced apart from one another in the circumferential direction. Rather, a preferred refinement of the invention proposes that the connecting brackets of the outer edge mountings are separate from one another and connected to the closing body via their respective assigned webs. Since the connecting brackets of the outer edge mountings are connected to the closing body separately from one another via their respective assigned webs, and the tensile forces thus defined act on the closing body, a positionally correct arrangement of the closing body in the closed position of the valve is promoted.

The correct positioning of the closing body in the closed position of the valve, and a defined application of the tensile forces acting on the closing body via the webs of the outer edge mountings, are promoted if each edge mounting has a centering geometry which cooperates with a preferably complementary counter-geometry of the at least one assigned holding base.

It is possible that the connecting bracket of at least one of the outer edge mounting is connected to the central closing body via more than two webs.

A structurally simple design according to the invention, which can be produced at comparatively low cost, is also provided if each edge mounting has a pair of webs which are connected together at their ends facing away from the closing body via a common connecting bracket.

Preferred embodiments of the invention provide that the connecting bracket of each edge mounting has at least one centering or positioning protrusion and/or recess which cooperates with a complementary counter-profiling on the at least one assigned holding base.

Thus the connecting brackets of the outer edge mountings, for example on their inside facing the holding base, may have at least one protrusion which is formed for example as a convex centering geometry and, for lateral positioning of the valve plate, is received in a preferably complementarily designed recess on the adjacent side of the holding base.

Another exemplary embodiment instead provides that the connecting brackets of the outer edge mountings, on their inside facing the holding base, have at least one recess which is formed for example as a concave centering geometry and, for lateral positioning of the valve plate, cooperates with a preferably complementarily designed protrusion on the adjacent side of the holding base. It is also possible that, on its side facing the holding base, the connecting bracket has a centering geometry which comprises at least one protrusion and at least one recess and which cooperates with a preferably complementary counter-geometry on the adjacent circumferential part region of the assigned holding base.

So that the centering geometry on the edge mountings on one side, and the preferably complementarily designed counter-geometry on the respective assigned holding bases on the other, always engage in one another securely and are correctly positioned via the valve movements, it is advantageous if the centering geometry is in each case arranged in the region of the edge side mountings which is not moved out of the plane, and hence preferably in the region of the connecting brackets.

If the centering geometry provided on the outer edge mounting is configured as a protrusion, it may be advantageous if the connecting bracket of one of each edge mounting has an approximately centrally arranged, preferably cam-shaped protrusion, whereby a correctly positioned arrangement of the valve plate above the valve opening and of the closing body above the valve seat can be ensured.

So that the webs of the edge mountings in the open position of the valve create a smallest possible by-flow cross-section, it is advantageous if the webs of the edge mountings arranged on opposite sides of the valve plate are arranged in pairs approximately in a line which preferably runs approximately tangentially to the closing body. Thus, at the same time it is ensured that the tension direction of the webs in each case acts at least mainly tangentially and in no case radially on the central closing body.

So that the connecting brackets of each edge mounting can lie securely and positionally correctly on the adjacent outer circumferential side of the assigned holding base, it is advantageous if, in its peripheral region affected by the assigned connecting bracket, at least one holding base is in particular convexly curved or rounded.

A manual and in some cases also automatic assembly of the valve according to the invention is further facilitated if the valve housing is delimited between adjacent valve housing parts.

For automatic assembly of the valve when joining the valve housing parts forming the valve housing, it is advantageous if at least one of the outer edge mountings in the valve housing part receiving the valve plate has form chamfers and/or inlet chamfers which cause an elastic preload of the valve plate in the plane of the receiving valve housing part during assembly of the valve housing parts. Thus, a design is preferred in which the receiving geometry, provided for receiving the valve plate, of the adjacent valve housing parts has inlet chamfers which, on joining of the housing parts, bring the valve plate into a usage position preloaded at the edge mountings between the valve housing parts.

A tight seal of the closing body provided on the valve plate against the valve seat is promoted if the valve seat protrudes beyond the plane formed by the edge-side mountings of the valve plate.

In order to promote a high movability and long lift travel of the webs of each edge mounting even under low force, it is advantageous if the bow-shape formed by the webs and the connecting brackets connecting them is preloaded towards the outside by bending. Here, a preferred embodiment of the invention provides that the connecting brackets protrude laterally on both sides beyond their assigned holding base, such that the connecting brackets connected by the webs are preloaded towards the outside by bending.

The secure arrangement of the valve plate in mounted state of the valve is promoted if the webs and the connecting brackets of each edge mounting are configured such that the deformation of the preload takes place largely, at least to more than half, in the connecting bracket (bending) of each edge mounting, and to a lesser extent in the webs (tensile extension). Here it is suitable if each connecting bracket is configured such that the preload-induced deformation of the edge-side mountings is greater in the region of their connecting bracket than in the region of the webs.

In order to compensate for the valve movement above all in the connecting brackets of the edge mounting, and to make less use of the elasticity of the valve plate in the region of the webs, it is advantageous if the webs and the connecting brackets of the edge mountings are configured such that the extension of the distance between the protrusions arranged on opposite sides of the valve plate, in the open position of the valve compared with the closed position, is more than half compensated by the additional bending of the connecting brackets.

In order to counter an unintentional detachment of the valve plate from the holding bases, arranged on both sides of the valve housing, during mounting of the valve, it is advantageous if each holding base has a height relative to the adjacent plane of the valve housing which is greater than the thickness of the valve plate.

Since a tensile stress still always acts on the outer edge mountings, even on swelling of the valve plate, in particular under the effect of the conveyed medium, and a resulting expansion of the valve plate in all three dimensions, it is advantageous if the valve plate is held between the holding bases arranged on both sides of the valve seat with such a preload that a tensile stress acts on the webs of the edge-side mountings even on swelling of the material used for the valve plate.

So that the closing body of the valve plate, in the closed position of the valve, lies tightly on the valve seat over its entire circumference, it is advantageous if the valve seat protrudes beyond the adjacent plane of the valve housing.

Even under high positive pressure differences, the functionality of the valve is always guaranteed if, on the side of the valve housing facing away from the valve seat, at least one lift stop is provided which protrudes beyond the adjacent plane of the valve housing and limits the maximum deflection of the closing body in the opening position of the valve.

In order to counter an excessive curvature of the valve plate in the region of its closing body in the open position of the valve, it is advantageous if the connection of the webs to the central closing body has the same width or is narrower than the webs. For this, preferred embodiments of the invention provide that the webs have a constant cross-section in the region between the connecting bracket on one side and their connection to the closing body on the other, or the webs have a cross-sectional thinning or constriction in the region of their connection to the closing body.

The valve plate of the valve according to the invention is not provided and not configured to also seal between the valve housing parts delimiting the valve chamber. It is therefore advantageous if, on the outer circumferential side, the valve plate is spaced from the valve housing at least in the region of the connecting brackets and in particular on all sides over the entire outer circumference of the valve housing, and/or if between the valve housing parts delimiting the valve housing, at least one ring seal is provided which runs with a spacing around the valve plate and is in particular separate from the valve plate.

The object cited initially is also achieved according to the invention with a diaphragm pump of the type cited initially which is configured with at least one inlet and/or at least one outlet valve as described herein.

BRIEF DESCRIPTION OF THE DRAWINGS

Refinements of the invention arise from the claims and the description in connection with the drawing. The invention is described in more detail below with reference to preferred exemplary embodiments.

In the drawings:

FIG. 8 shows a valve plate comparable to that of FIG. 1, in a detail illustration, in the region of one of its outer edge mountings, wherein on the circumferential part region of the connecting bracket intended for contact on a holding base, a centering geometry is provided which is formed from two cam-shaped protrusions which are spaced apart from one another by an also cam-shaped recess, FIG. 9 shows a valve plate comparable to that of FIG. 1, in a detail illustration, in the region of one of its outer edge mountings, wherein the connecting bracket here has a centering geometry in the form of an arrow tip arranged approximately in the center of the connecting bracket, and FIG. 10 shows a valve plate having three outer edge mountings, each cooperating with a holding base on the valve housing and arranged with equal spacing around the circumference of the valve plate and engaging on a central closing body.

DETAILED DESCRIPTION

Figure 1:
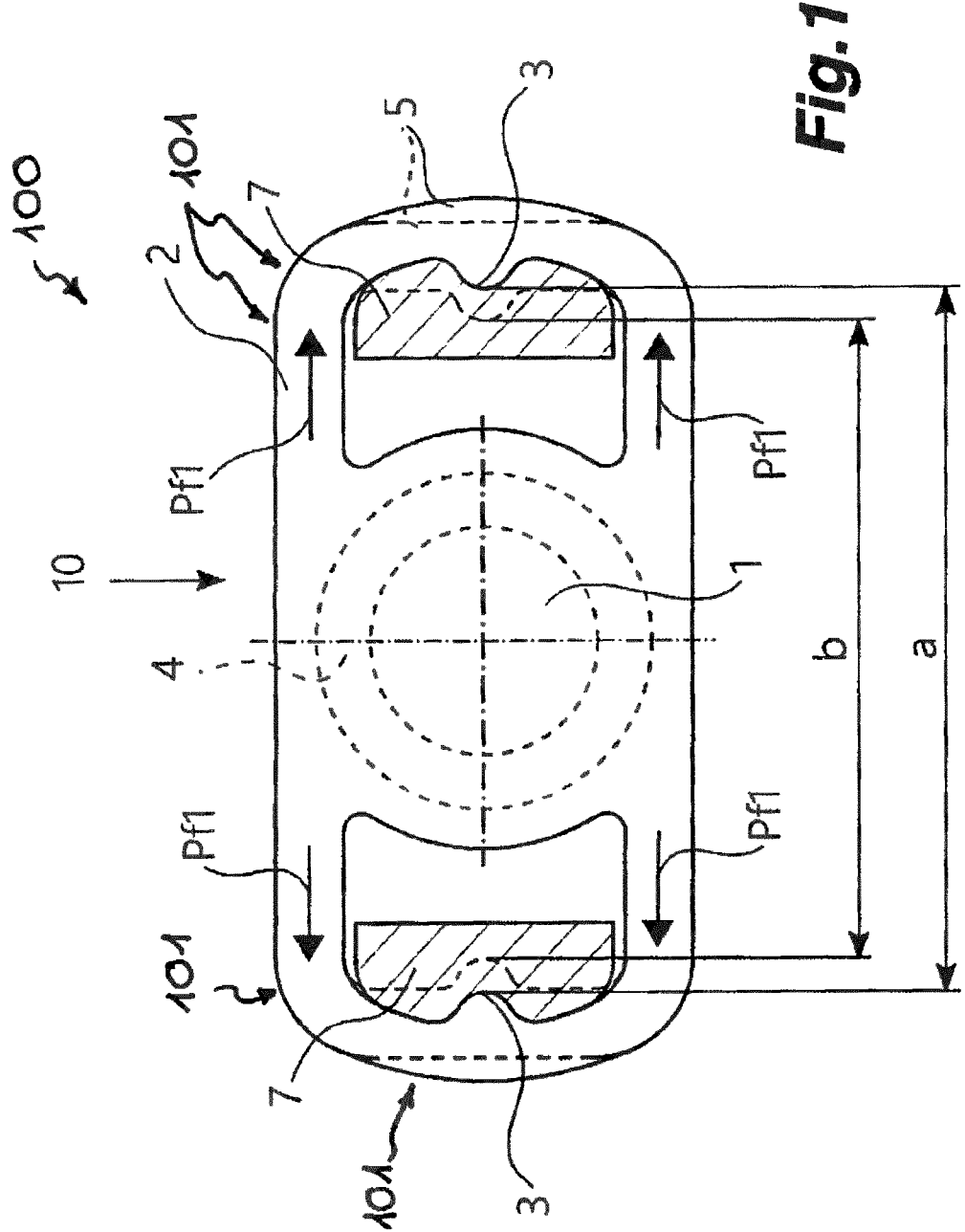
FIG. 1 shows a valve plate with a central closing body, which is circular in top view and has outer edge mountings arranged on opposite sides, each with a pair of mutually spaced webs which are connected together at their web ends facing away from the closing body via a connecting bracket, wherein the outer edge mountings engage with tensile stress on an assigned holding base such that the correct position of the closing body above a valve seat is maintained.

FIGS. 1 and 10 show two designs of a valve 100, which is configured as a plate valve and can be used as an inlet or outlet valve of a diaphragm pump or as a pressure-controlled check valve. The 100 has a valve chamber 14 (not shown in detail in FIGS. 2 and 3), in which a valve seat 4 is provided.

The valve seat 4 cooperates with a valve plate 10, which is elastically preloaded for tension via outer edge mountings 101 such that a here plate-like central closing body 1 lies tightly on the valve seat 4 and can be moved into an open position against the elasticity of the material used for the valve plate 10, at least in the region of its outer edge mountings 101.

In the top view of FIG. 1, it is evident that the outer edge mountings 101 may be provided on the valve plate 10 on opposite sides of the valve seat 4. In contrast, the valve plate 10 according to FIG. 10 has three outer edge mountings 101 which are evenly distributed over the circumference of the closing body 1. The outer edge mountings 101 are disconnected from one another and engage only on the closing body 1. Each outer edge mounting 101 of the valve plates shown in FIGS. 1 and 10 has at least two webs 2. The webs of each outer edge mounting 101 are connected together at their web ends facing away from the closing body 1 by a connecting bracket 5. Each of the connecting brackets 5 engages behind at least one assigned holding base 7 of the valve housing. It is evident in FIG. 1 that each of the connecting brackets 5 engages behind at least one assigned holding base 7 of the valve housing, and that each edge mounting 101 has a pair of webs 2 which are connected together at their ends facing away from the closing body 1 via a common connecting bracket 5.

The connecting brackets 5 of the outer edge mountings 101 are connected to the closing body 1 separately from one another via their respective assigned webs 2. It is evident from FIG. 1 that each edge mounting 101 has a centering geometry which cooperates with a preferably complementary counter-geometry of the at least one assigned holding base 7. In the exemplary embodiment of FIG. 1, the connecting bracket 5 of each edge mounting 101 has at least one centering or positioning protrusion or recess which cooperates with a complementary counter-profiling on the assigned holding base 7, wherein the connecting bracket 5 of each edge mounting 101 has a protrusion 3 arranged approximately centrally and preferably configured in the form of a cam. A comparison of the detail illustrations shown in FIGS. 7, 8 and 9 shows that the connecting bracket 5 of each edge mounting 101 has at least one centering or positioning protrusion or recess 3, 103 which cooperates with a complementary counter-profiling on the at least one assigned holding base 7.

Figure 7:
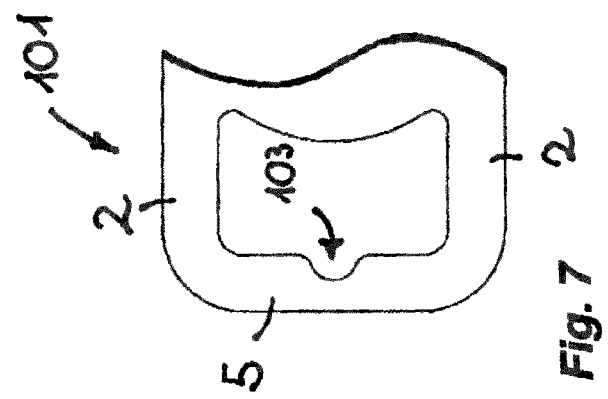
FIG. 7 shows a valve plate formed as in FIG. 1, in a detail illustration, which has a centering or positioning recess on the connecting bracket which cooperates with a protrusion on the assigned holding base.
Figure 6:
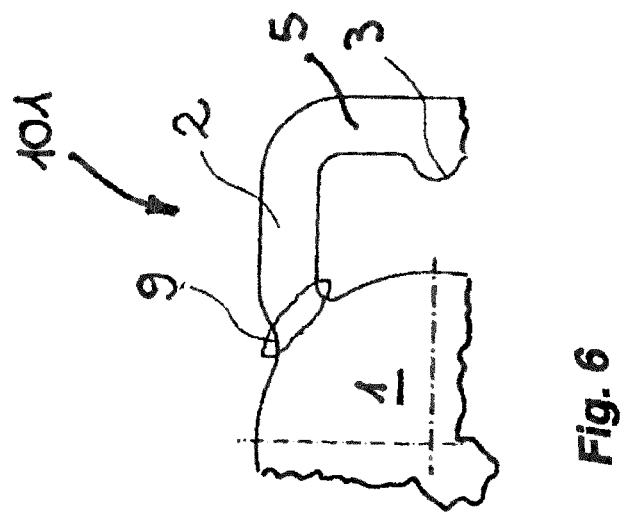
FIG. 6 shows a valve plate formed as in FIG. 1, in a detail illustration, in the region of the connection between one of its outer edge mountings and the central closing body.

As shown in FIG. 7, the connecting bracket 5 of each edge mounting 101 may have at least one centering or positioning protrusion or recess which cooperates with a complementary counter-profiling on the at least one assigned holding base 7.

FIG. 1 shows that the webs 2 of edge mountings 101 arranged on opposite sides of the valve plate 10 are arranged in pairs approximately in a line running preferably approximately tangentially to the closing body 1. The connecting brackets 5 connecting together the webs 2 of each edge mounting 101 each lie on the adjacent circumferential part region of the holding base 7 assigned to said edge mounting 101, wherein the at least one holding base 7 is in particular convexly curved or rounded in its circumferential region affected by the assigned connecting bracket 5. The connecting brackets 5 connecting together the webs 2 of each edge mounting 101 each lie on the adjacent circumferential part region of the holding base 7 assigned to said edge mounting 101, wherein the at least one holding base 7 is in particular convexly curved or rounded in its circumferential region affected by the assigned connecting bracket 5.

It is clear from FIGS. 2 to 5 that the valve chamber 14 is delimited between adjacent valve housing parts 8, 15 which form the valve housing. The valve housing may also be an integral part of the pump head of a diaphragm pump.

The valve seat 4, which delimits the valve opening 12, 13 for example of an inlet or outlet channel, here protrudes beyond the plane formed by the outer edge mountings 101 of the valve plate 10. The connecting brackets 5 protrude laterally on both sides beyond their assigned holding base 7, such that the webs 2 connected by the connecting brackets 5 are preloaded towards the outside by bending. Each connecting bracket 5 is here configured such that the preload-induced deformation of the edge-side mountings 101 is greater in the region of their connecting brackets 5 than in the region of the webs 2. It is evident from FIG. 1 that the edge-side mountings 101 are configured such that the extension of the distance between the protrusions arranged on opposite sides of the valve plate 10, in the open position (line b) of the valve in comparison with the closed position (line a), is more than half compensated by an additional bending of the connecting brackets 5. Each holding base 7 here has a height relative to the adjacent plane of the valve housing which is greater than the thickness of the valve plate 10. It is clear from FIGS. 2 and 3 that the valve seat 4 protrudes beyond the adjacent plane of the valve housing, and that on the side of the valve housing facing away from the valve seat 4, at least one lift stop 102 is provided which protrudes beyond the adjacent plane of the valve housing and limits the maximum deflection of the closing body 1 in the open position of the valve 100.

Since the valve plate 10 need not perform any additional functions with respect to sealing the separating plane between the mutually adjoining valve housing parts 8, 15, the valve plate 10 on the outer circumferential side may be spaced from the valve housing, at least in the region of the connecting brackets 5 and in particular on all sides over the entire outer circumference of the valve housing. At least one ring seal 11 is provided between the valve housing parts 8, 15 delimiting the valve housing, which seal runs around the valve plate 10 at a distance and is in particular separate from the valve plate 10.

The valve plate 10 of the valve 100 is held at the edges at the outer edge mountings 101 and elastically preloaded. The valve, which may be described as a bracket valve because of its connecting brackets 5, is passively actuated by the pressure difference. As FIG. 1 shows, the two opposing pairs of webs 2, which connect the valve plate 10 to the holding bases 7 via their outer edge mountings 101, are connected at least in pairs on the clamping side of the holding bases 7 and by bending of the connecting brackets 5, the web pairs of the edge mountings 101 are always under tensile stress. On the circumferential side of the connecting brackets 5 facing the assigned holding base 7, a centering geometry is provided which is present with a corresponding negative form on the side of the holding base 7 adjacent to the connecting bracket 5, and positions the closing body 1 over the valve seat 4.

In the exemplary embodiment shown in FIG. 1, the centering geometry provided on the connecting brackets 5 is formed by a protrusion 3 arranged approximately centrally and configured as a cam. As FIG. 8 shows, on its bracket inside, the connecting bracket 5 may also have two such protrusions 3 which are connected together via an intermediate, approximately centrally arranged recess 103.

FIG. 9 shows that the protrusion provided on the inside of the connecting bracket 5, here also centrally, may be configured as an arrow tip, wherein this arrow-like protrusion 3 of the connecting bracket 5 shown in FIG. 9 engages in a corresponding negative form on a holding base (not illustrated further here).

A comparison of FIGS. 2 and 4, or FIGS. 3 and 5, shows that during mounting of the valve 100, the valve plate 10 is laid on one of the valve housing parts, here on the respective lower valve housing part 15. The preload of the webs 2, both in the longitudinal direction Pf1 and also in the plane of the valve seat 4, is achieved by the engagement of the valve housing parts 8, 15 which adjoin one another in mounted state. The receiving geometry of the valve housing parts 8, 15 which adjoin one another in mounted state may be formed by corresponding inlet chamfers 6, so that the preload of the valve plate 10 is achieved during manual or also automatic joining of the housing parts 8, 15 without an additional mounting step being required. This also facilitates an automatic mounting of the valve 100 without needing to omit the functionally important preload in the region of the outer edge mountings 101.

The receiving geometry in the valve housing parts 8, 15 for the valve plate 10 may be arranged in the lower valve housing part 15 or in the upper valve housing part 8, depending on requirements. For simplified assembly however, it is useful if the receiving geometry is provided in the lower valve housing part 15 both for the inlet valve shown in FIGS. 2 and 4 and also for the outlet valve shown in FIGS. 3 and 5.

The centering geometry provided on the connecting brackets 5, here the protrusions 3, correctly positions the valve plate 10 with its closing body 1 above the valve seat 4. This positioning and hence also the valve function are not lost even on a slight swelling of the material used for the valve plate 10. The swelling only reduces the elastic preload of the valve plate 10 acting in the arrow direction Pf1 in the region of the outer edge mountings 101.

So that the closing body 1 lies tightly on the valve seat 4 in the closed position of the valve 100, the valve seat 4 protrudes slightly beyond the plane of the edge side mountings 101 of the valve plate 10. The precise amount of this protrusion is subject to component tolerances. In the valve 100 according to the invention as shown here, the closing function of the valve 100 is less dependent on the precise amount of protrusion of the valve seat 4 than is the case with the other previously known valve forms. This is because of the connection of the valve plate 10 to the valve housing by the least two webs 2 of each edge mounting 101, which leads to less bending of the valve plate 10.

In comparison with other plate valves which are preloaded in length, with the valve 100 shown here, automatic assembly is also easier. The connection of at least two webs 2 to the edge-side mountings 101 makes it easier for a gripper to hold the valve plate 10 and in particular preload this elastically. The automatic assembly of the valve 100 shown here may be further simplified by a component structure. As FIGS. 4 and 5 in particular show, the valve plate 10 is laid on the lower housing part 15 and the preload of the outer edge mountings 101 in the region of the webs 2 or the connecting brackets 5, in both in the longitudinal direction Pf1 and in the plane of the valve seat 4, is achieved by the joining and assembly of the two valve housing parts 8, 15 in the mounting direction Pf2. The preload of the valve plate 10 in the region of the edge mountings 101 is here achieved by the form chamfers 6.

In comparison with previously known valve designs, in which the valve plate 10 also integrates the ring seal arranged on the outer circumferential side, the bracket valve shown here takes up less space. This leads to a smaller less space (dead space) when the valve 100 is used for example as an inlet and/or outlet valve of a diaphragm pump (not shown in more detail here).

Figure 2:
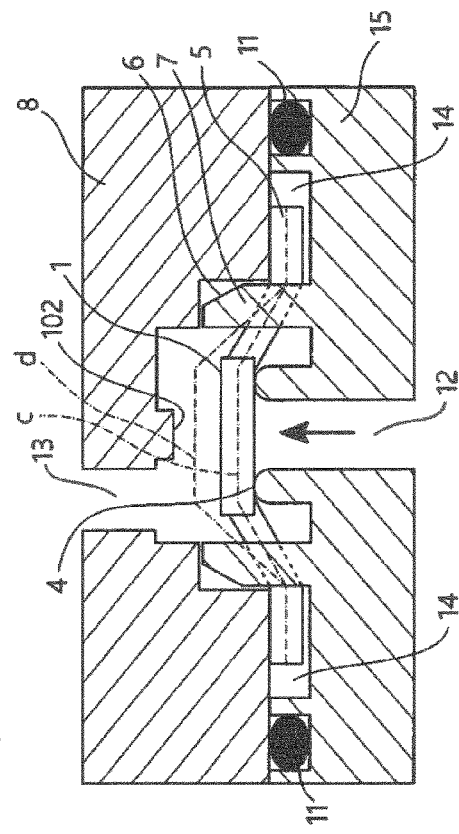
FIG. 2 shows the valve from FIG. 1, here formed as an inlet valve of the diaphragm pump, in a longitudinal section through the valve housing, wherein the valve plate of the valve is held in a valve chamber delimited between two adjacent valve housing parts.
Figure 3:
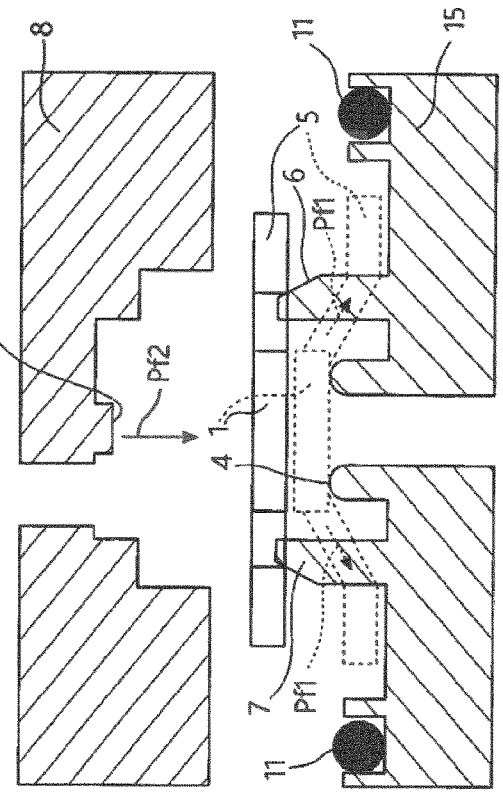
FIG. 3 shows the valve from FIG. 1, here formed as an outlet valve of a diaphragm pump, in a longitudinal section through the valve housing, wherein here again the outlet valve is held in a valve chamber delimited between two adjacent valve housing parts, and wherein the housing geometry provided to receive the valve plate is arranged in FIGS. 2 and 3 in the lower valve housing part serving as a base.
Figure 4:
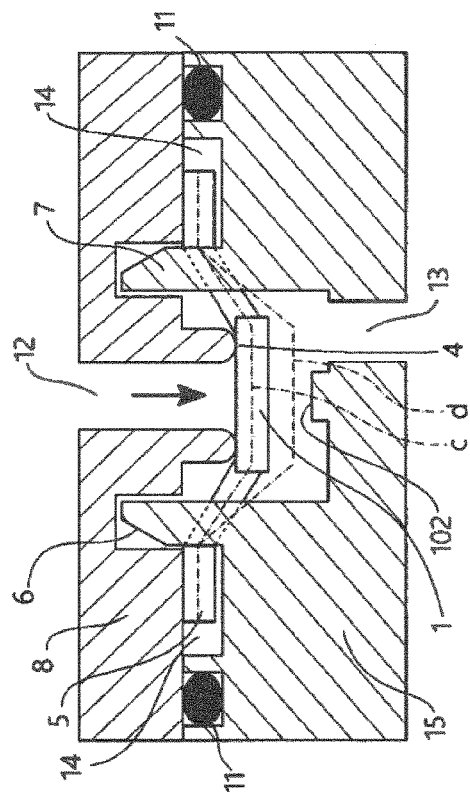
FIG. 4 shows the inlet valve from FIG. 2 during assembly of the valve, before joining of the valve housing parts which adjoin one another in mounted state.
Figure 5:
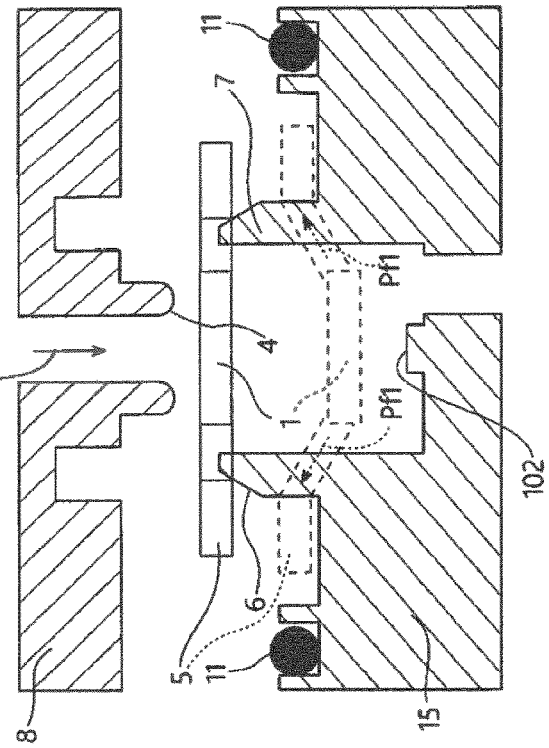
FIG. 5 shows the outlet valve from FIG. 3 during assembly of the valve, in a longitudinal section, before joining of the valve housing parts which adjoin one another in mounted state.

A combined view of FIGS. 2 to 5 shows that the lower valve housing part 15 is the one which has the holding bases 7 for the edge-side mounting of the valve plate 10. In FIGS. 2 and 3, the dotted line c corresponds to the neutral line of the valve 100 in the closed position, while line d corresponds to that of the valve 100 in the open position. The webs 2 and the connecting bracket 10 of each edge mounting are configured such that with the valve open, the extension of the line b shown in FIG. 1, in comparison with the line a shown there, in the closed state, is largely—at least more than half—compensated by additional bending of the connecting brackets 5, and to a lesser extent by tensile elongation of the webs.

FIG. 10 shows the valve plate 10 of a valve (not otherwise shown), wherein on the valve plate 10 from FIG. 10, three outer edge mountings 101 are provided which are arranged at equal distances around the circumference of the valve plate 10. Each of the edge-side mountings has a connecting bracket 5, which is connected via a pair of webs 2 to the central closing body 1 of the valve plate 10, here also formed circular. Each of the edge mountings formed by a pair of webs 2 and a connecting bracket 5 engages, as shown in FIG. 1, behind a corresponding holding base 7 of the valve housing.

LIST OF REFERENCE SIGNS

1 Closing body
2 Web
3 Protrusion (on connecting bracket)
4 Valve seat
5 Connecting bracket
6 Form chamfer
7 Holding base
8 Upper valve housing part
9 Connecting region between webs 2 and closing body 1
10 Valve plate
11 Ring seal
12 Inlet opening
13 Outlet opening
14 Valve chamber
15 Lower valve housing part
100 Valve
101 Outer edge mounting
102 Lift stop
103 Recess
Pf1 Force direction of preload/tensile forces
Pf2 Force direction on joining of valve housing parts 8, 15
a Distance between protrusions 3 on opposite sides of valve 100 in closed state
b Distance between protrusions 3 on opposite sides of valve plate 10 in open state of valve 100
c Neutral line of valve in closed position
d Neutral line of valve in open position

The invention claimed is:
1. A valve (100), comprising:
a valve chamber (14) which is delimited by a valve housing and in which a valve seat (4) is provided which cooperates with a valve plate (10);
said valve plate (10) is elastically preloaded for tension via outer edge mountings thereof (101) such that a closing body (1) of the valve plate (10) is movable from a closed position, in which the closing body (1) lies tightly on the valve seat (4), into an open position against an elasticity of the valve plate (10) at least in a region of the outer edge mountings (101);

the outer edge mountings (101) of the valve plate (10) have webs (2), and the outer edge mountings (101) have connecting brackets (5) which are connected to ends of the webs (2) facing away from the closing body (1);

the outer edge mountings (101) are disconnected from one another and engage only on the closing body (1), each said outer edge mounting (101) has at least two of the webs (2), the webs (2) of each said outer edge mounting (101) are connected together via a respective one of the connecting brackets (5), and each said connecting bracket (5) engages behind at least one assigned holding base (7) of the valve housing; and the connecting brackets (5) protrude laterally on both sides beyond the respective holding base (7) such that the connecting brackets (5) are preloaded towards an outside by bending.

2. The valve as claimed in claim 1, the connecting brackets (5) are separate from one another and connected to the closing body (1) via the respective at least two of the webs (2).

3. The valve as claimed in claim 1, wherein each said edge mounting (101) has a centering geometry which cooperates with a counter-geometry of the at least one assigned holding base (7).

4. The valve as claimed in claim 1, wherein each said edge mounting (101) has a pair of webs (2) which are connected together at ends thereof facing away from the closing body (1) via a common said connecting bracket (5).

5. The valve as claimed in claim 1, wherein the connecting bracket (5) of each said edge mounting (101) has at least one centering or positioning protrusion or recess (3; 103) which cooperates with a complementary counter-profiling on the at least one assigned holding base (7).

6. The valve as claimed in claim 1, wherein the connecting bracket (5) of each said edge mounting (101) has an approximately centrally arranged protrusion (3).

7. The valve as claimed in claim 1, wherein the webs (2) of the outer edge mountings (101) are provided on opposite sides of the valve seat (4) on the valve plate (10).

8. The valve as claimed in claim 1, wherein the webs (2) of the edge mountings (101) arranged on opposite sides of the valve plate (10) are arranged in pairs approximately in a line which extends to the closing body (1).

9. The valve as claimed in claim 1, wherein in a peripheral region affected by the respective connecting bracket (5), the at least one holding base (7) is convexly curved or rounded.

10. The valve as claimed in claim 1, wherein the valve chamber (14) in the valve housing is delimited between adjacent valve housing parts (8, 15).

11. The valve as claimed in claim 10, wherein a receiving geometry, provided for receiving the valve plate (10), of the valve housing parts (8, 15) has inlet chamfers (6) which, on joining of the valve housing parts (8, 15), bring the valve plate (10) into a usage position preloaded at the edge mountings (101) between the valve housing parts (8, 15).

12. The valve as claimed in claim 1, wherein the valve seat (4) protrudes beyond a plane formed by the edge-side mountings (101) of the valve plate (10).

13. The valve as claimed in claim 1, wherein each said connecting bracket (5) is configured such that a preload-induced deformation of the edge-side mountings (101) is greater in a region of the respective connecting bracket (5) than in a region of the webs (2).

14. The valve as claimed in claim 1, wherein the edge-side mountings (101) are configured such that an extension of a distance between protrusions (3) arranged on opposite sides of the valve plate (10), in the open position of the valve (100) compared with the closed position, is more than half compensated by additional bending of the connecting brackets (5).

15. The valve as claimed in claim 1, wherein each said holding base (7) has a height relative to an adjacent plane of the valve housing which is greater than a thickness of the valve plate (10).

16. The valve as claimed in claim 1, wherein the valve plate (10) is held between the holding bases arranged on both sides of the valve seat (4) with a preload such that a tensile stress acts on the webs (2) of the edge-side mountings (101) even upon swelling of a material used for the valve plate (10).

17. The valve as claimed in claim 1, wherein the valve seat (4) protrudes beyond an adjacent plane of the valve housing.

18. The valve as claimed in claim 1, further comprising on a side of the valve housing facing away from the valve seat (4), at least one lift stop (102) which protrudes beyond an adjacent plane of the valve housing and limits a maximum deflection of the closing body (1) in the open position of the valve (100).

19. The valve as claimed in claim 1, wherein the webs (2) have a constant cross-section in a region between the connecting bracket (5) on one side and a connection to the closing body (1) on an other side, or the webs have a cross-sectional thinning or constriction in the region of the connection to the closing body (2).

20. The valve as claimed in claim 1, wherein on an outer circumferential side, the valve plate (10) is spaced from the valve housing at least in a region of the connecting brackets (5).

21. The valve as claimed in claim 1, further comprising at least one ring seal (11) between the valve housing parts (8, 15) delimiting the valve housing, the at least one ring seal (11) extends with a spacing around the valve plate (10) and is separate from the valve plate (10).

22. A diaphragm pump with at least one inlet valve and at least one outlet valve, and at least one of the at least one inlet valve or the at least one outlet valve comprises the valve according to claim 1.

* * * * *